United States Patent
Panciroli

(10) Patent No.: US 7,092,812 B2
(45) Date of Patent: Aug. 15, 2006

(54) CONTROL METHOD AND DEVICE FOR AN INTERNAL COMBUSTION ENGINE

(75) Inventor: Marco Panciroli, Ravenna (IT)

(73) Assignee: Magneti Marelli Powertrain S.p.A. (IT)

( * ) Notice: Subject to any disclaimer, the term of this patent is extended or adjusted under 35 U.S.C. 154(b) by 35 days.

(21) Appl. No.: 10/873,725

(22) Filed: Jun. 22, 2004

(65) Prior Publication Data

US 2005/0027433 A1   Feb. 3, 2005

(30) Foreign Application Priority Data

Jun. 23, 2003   (IT)   ............................ B02003A0391

(51) Int. Cl.
  *G06F 19/00*   (2006.01)
(52) U.S. Cl. ...................... 701/101; 701/111
(58) Field of Classification Search ................ 701/101, 701/111, 106, 112; 123/90.12, 90.1
  See application file for complete search history.

(56) References Cited

U.S. PATENT DOCUMENTS

| | | | |
|---|---|---|---|
| 3,710,150 A * | 1/1973 | McMaster ............... | 310/323.19 |
| 4,945,876 A * | 8/1990 | Nakaniwa ................ | 123/406.3 |
| 5,797,360 A * | 8/1998 | Pischinger et al. ...... | 123/90.11 |
| 6,167,852 B1 | 1/2001 | Kamimaru et al. ...... | 123/90.11 |
| 6,349,685 B1 | 2/2002 | Kolmanovsky .......... | 123/90.11 |
| 6,536,389 B1 | 3/2003 | Shelby et al. ............ | 123/90.15 |
| 6,736,109 B1 * | 5/2004 | Hoshino ................ | 123/406.29 |
| 2002/0124818 A1 | 9/2002 | Christiani et al. ....... | 123/90.12 |
| 2003/0066899 A1* | 4/2003 | Gipson et al. ................. | 239/5 |

FOREIGN PATENT DOCUMENTS

| | | |
|---|---|---|
| EP | 0577485 A | 1/1994 |
| EP | 0916815 A | 5/1999 |
| EP | 1233152 A | 8/2002 |

* cited by examiner

*Primary Examiner*—John T. Kwon
(74) *Attorney, Agent, or Firm*—Howrey LLP

(57) ABSTRACT

A control method for an internal combustion engine provides for the acquisition of a signal correlated with the vibrations transmitted by at least one component of the internal combustion engine moving between two end positions; the vibrations are transmitted by the impact of the moving component against an abutment disposed at the location of at least one of the end positions during the operation of the internal combustion engine.

20 Claims, 2 Drawing Sheets

CONTROL METHOD AND DEVICE FOR AN INTERNAL COMBUSTION ENGINE

CROSS REFERENCE TO RELATED APPLICATIONS

The present application claims priority to Italian Patent Application Serial No. BO2003A 000391 filed Jun. 23, 2003.

FIELD OF THE INVENTION

The present invention relates to a control method for an internal combustion engine.

DESCRIPTION OF RELATED ART

An internal combustion engine comprises a multiplicity of components moving between two end positions. These moving components include the valves, which are generally actuated by a camshaft. Alongside this technology, long consolidated in the automobile engineering sector, alternative valve actuation systems are currently being tried out. This applicants are in particular experimenting with an electro-hydraulic actuation unit for the valves of an internal combustion engine of the type disclosed in European Patent 1,233,152 in the name of the applicants. This electro-hydraulic unit is driven by an electronic unit and makes it possible very accurately to vary the instants of opening and closure of each valve in accordance with a cycle assigned as a function of the angular speed of the crankshaft and other operating parameters, thereby substantially improving the performance of the internal combustion engine.

The electro-hydraulic unit currently being tested comprises, for each intake and/or exhaust valve of the engine, an electro-hydraulic actuation device which comprises a hydraulic actuator adapted axially to move the valve from the closed position to the position of maximum opening, overcoming the action of an elastic member adapted to maintain this valve in the closed position, and a hydraulic distributor valve adapted to regulate the flow of pressurized oil to and from this hydraulic actuator so as to control the displacement of the valve between the closed position and the position of maximum opening.

In order to provide for the pressurized oil, the electro-hydraulic unit being tested is provided with a hydraulic circuit comprising an oil collection tank, within which the oil to be supplied to the actuators is stored, and a pump unit adapted to supply pressurized oil to the various distributors by taking it directly from the collection tank. The electro-hydraulic unit disclosed in European Patent Application 1,233,152 comprises a slide distributor valve which is able to assume a first operating position in which it brings the linear hydraulic actuator into direct communication with the fluid collection tank, a second operating position, in which it isolates the linear hydraulic actuator so as to prevent the flow of fluid to and from this actuator and a third operating position in which it brings the linear hydraulic actuator into direct communication with a branch containing the pressurized fluid.

The unit as disclosed has the substantial advantage that its structure is particularly simple, which ensures a high degree of reliability over time, thus enabling its use in the automobile engineering sector.

However, the wide range of adjustments possible as a result of the hydraulic actuation of the valves requires a control of the engine able to monitor whether the operation of the engine in general, and whether the actuation of the valves in particular, is actually taking place according to the assigned cycle.

SUMMARY OF THE INVENTION

The object of the present invention is to provide a control method for an internal combustion engine able to monitor the operation of the engine in a simple and economic manner.

The present invention therefore relates to a control method for an internal combustion engine, which internal combustion engine comprises at least one component moving between two end positions, each moving component transmitting vibrations at the location of at least one of these end positions during the operation of the internal combustion engine, the method providing for the acquisition of a signal correlated with these vibrations.

The present invention relates to a control device for an internal combustion engine.

The present invention therefore relates to a control device for an internal combustion engine, which internal combustion engine comprises at least one component moving between two end positions, each moving component transmitting vibrations at the location of at least one of these end positions during the operation of the internal combustion engine, the device comprising acquisition means for acquiring a signal correlated with these vibrations.

DESCRIPTION OF THE FIGURES

The present invention is described below with reference to the accompanying drawings, which show non-limiting embodiments thereof, in which.

DETAILED DESCRIPTION OF THE INVENTION

Figure 1:
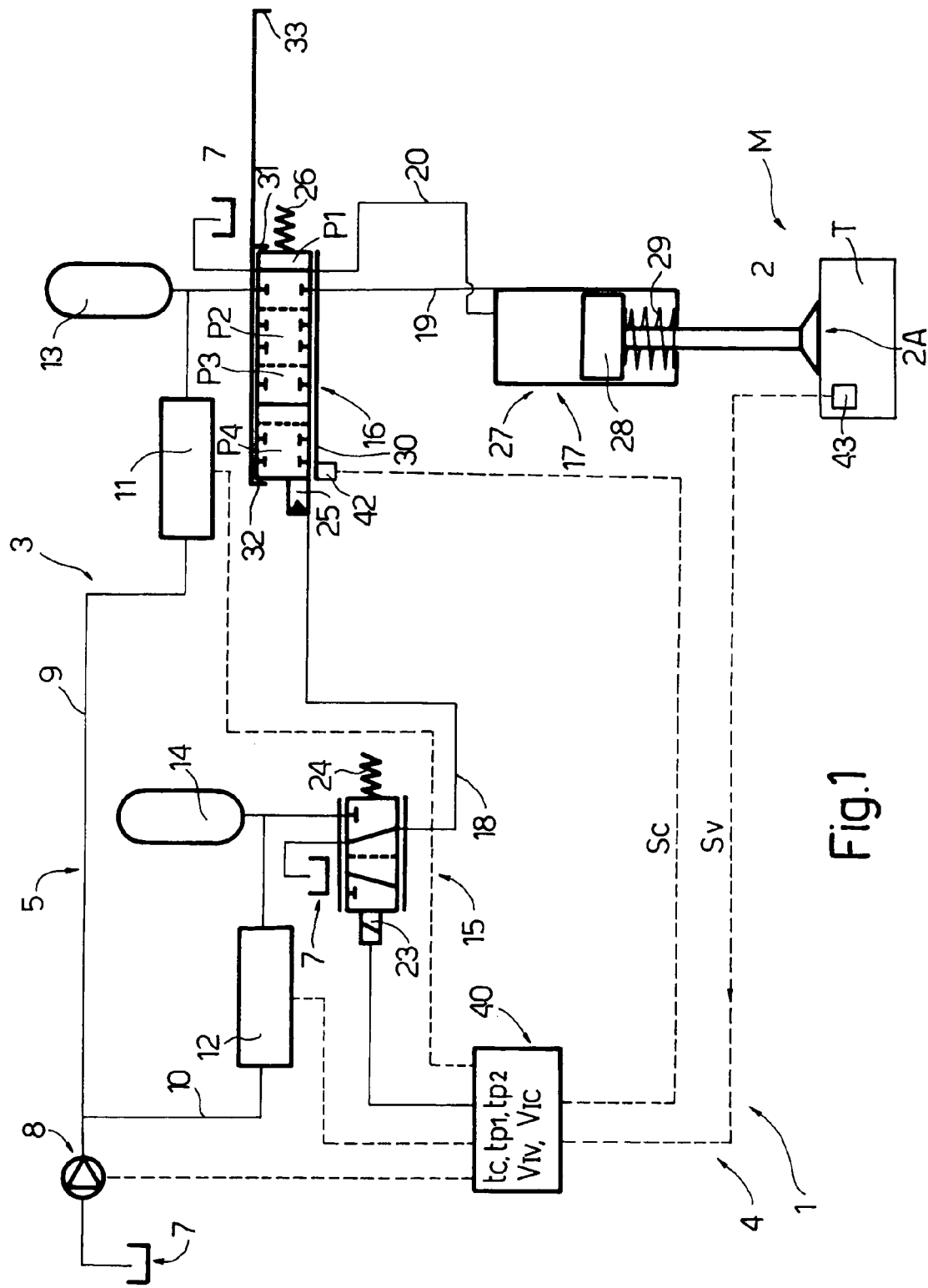
FIG. 1 is a diagrammatic view of an engine fitted with a control device of the present invention.

In FIG. 1, an internal combustion engine is shown overall by M and comprises a head T and an electro-hydraulic actuation unit 1 for the actuation of valves 2. FIG. 1 shows a single valve 2 coupled to a respective seat 2A disposed on the head T, although it will be appreciated that the electro-hydraulic unit 1 is adapted to drive all the intake and exhaust valves of the engine M. In this description, the opening of the valve 2 is defined as the phase of transition of the valve 2 from the closed position to the position of maximum opening; the closure of the valve 2 is defined as the phase of transition of the valve 2 from the position of maximum opening to the closed position; and maintenance is defined as the phase during the which the valve 2 remains in the position of maximum opening. The terms opening, closing and maintaining the valve 2 consequently have the same meaning.

The unit 1 comprises a hydraulic circuit 3 and a control device 4. In turn, the hydraulic circuit 3 comprises a circuit 5 common to all the valves 2 and a plurality of actuation devices 6, each of which is associated with a respective valve 2. In FIG. 1, for reasons of simplicity, only one device 6 associated with its respective valve 2 is shown.

The circuit 5 comprises a collection tank 7 for oil at ambient pressure, a pump unit 8 and two branches 9 and 10 which are supplied with pressurized fluid and along which respective pressure regulators 11 and 12 and respective pressure accumulators 13 and 14 are disposed in sequence. The two branches 9 and 10 of the circuit 5, downstream of the respective accumulators 13 and 14, are connected to the actuation devices 6, each of which comprises a control selector 15, a slide distributor valve 16 and a hydraulic actuator 17 rigidly connected to the valve 2. The selector 15 is connected to the branch 10, the tank 7 and a branch 18 which connects the selector 15 to the slide distributor valve 16 in order to drive this slide distributor valve 16.

The slide valve 16 is connected to the branch 9, the tank 7 and a supply branch 19 to the actuator 17 and an exhaust branch 20 from the actuator 17.

The selector 15 is a three-way valve controlled by an electromagnet 23 and a spring 24 and is adapted to assume two positions: the spring 24, when the electromagnet 23 is not excited, maintains the selector in the first position, in which the branch 10 is closed off, while the branch 18 is connected to the tank 7 (FIG. 1); the electromagnet 23, when excited, overcomes the force of the spring 24 and disposes the selector 15 in the second position in which the branch 10 is connected to the branch 18.

The slide distributor valve 16 is a four-way valve driven by a piston 25 and a spring 26 and is adapted substantially to assume four operating positions shown by P1, P2, P3 and P4 in FIG. 1. Although the slide valve 16 has four operating positions P1, P2, P3 and P4, in practice it has only two stable positions, i.e. the end positions shown by P1 and P4 respectively in FIG. 1. The operating positions P2 and P3 are transit positions between the opposing operating positions P1 and P4. In the operating position P1, the branch 20 is connected to the tank 7, while the branch 9 and the branch 19 are disconnected; in the operating position P2, all the connections are discontinued; in the operating position P3, the branch 9 is connected to the branch 19, while the exhaust branch 20 is closed off: for this reason, the operating position P3 is defined as the actuation position; the operating position P4 again shows the same characteristics as the operating position P2.

The linear hydraulic actuator 17 comprises a cylinder 27, a piston 28 connected to the valve 2 and a spring 29 adapted to maintain the valve 2 in the closed position.

The slide valve 16 comprises a bushing 30, a slide 31 sliding in the bushing 30 and two end abutments 32 and 33 which define the respective stable operating positions P1 and P4.

The control device 4 comprises an electronic control unit 40 which, as a function of data detected from the engine M such as, for instance, the number of revolutions and other operating parameters, determines the instant of opening and the instant of closure of each valve 2. The unit 40 therefore controls the electromagnet 23 in order to determine, in cascade, the actuation of the selector 15 of the slide distributor valve 16 and the linear actuator 17. The control device 4 further comprises an accelerometer 42 mounted on the slide distributor valve 16 and an accelerometer 43 mounted on the head T.

The unit 40, as well as controlling the electromagnet 23, also controls the pressure regulators 11 and 12 and the passage section of the orifice 22 of variable section and acquires the signals supplied by the accelerometers 42 and 43 in order to modify the assigned cycle in closed loop as a function of the signals supplied by the accelerometers 42 and 43.

The signals acquired by the accelerometer 42 are substantially correlated with the vibrations caused by the impacts of the slide 31 against the abutments 32 and 33, while the signals acquired by the accelerometer 43 are correlated with the vibrations generated by the impacts of the valve 2 against its respective seat 2A. The amplitude of the vibration is correlated with the energy dissipated in the impact and therefore with the mass and speed of the slide 31 and the valve 2 respectively.

In operation, the control unit 40 excites the electromagnet 23 according to an assigned cycle in order to determine, in cascade, the actuation of the selector 15, the slide valve 16 and the actuator 17. The sensors 42 and 43 detect respective signals $S_c$ and $S_v$ and the unit 40 processes these signals $S_c$ and $S_v$ in order to calculate the speed of impact $V_{ic}$ of the slide 31 against the respective abutments 32 and 33 and the speed of impact $V_{iv}$ of the valve 2 against its respective seat 2A. The speeds of impact of the slide 31 are shown by $V_{ic}$ irrespective of whether they are a speed of impact against the abutment 32 or against the abutment 33. The unit 40 acquires the instant $t_c$ of closure of the valve 2: the instant $t_c$ is the instant in which the impact between the valve 2 and its respective seat 2A takes place. The control unit 40 also acquires the instants $t_{P1}$ and $t_{P4}$ which are the instants in which the slide 31 impacts against the abutment 31 and the abutment 32 respectively.

On the basis of these data $t_c$, $t_{P1}$, $t_{P2}$, $V_{iv}$ and $V_{ic}$, the control unit 40 is able to modify the commands of the electromagnet 23 in closed loop. Moreover, the control unit 40 is able to detect any operating anomalies such as excessive friction or decay of the springs by means of a single sensor for each moving component.

According to a variant not shown in FIG. 1, each sensor is associated with a filter in order to filter the signal $S_c$ or $S_v$ in order to eliminate the influences of the vibrations caused by other moving components and by background noise. The influences of the other moving components depend on the degree of sensitivity of the sensor and on the position in which this sensor is mounted.

Figure 2:
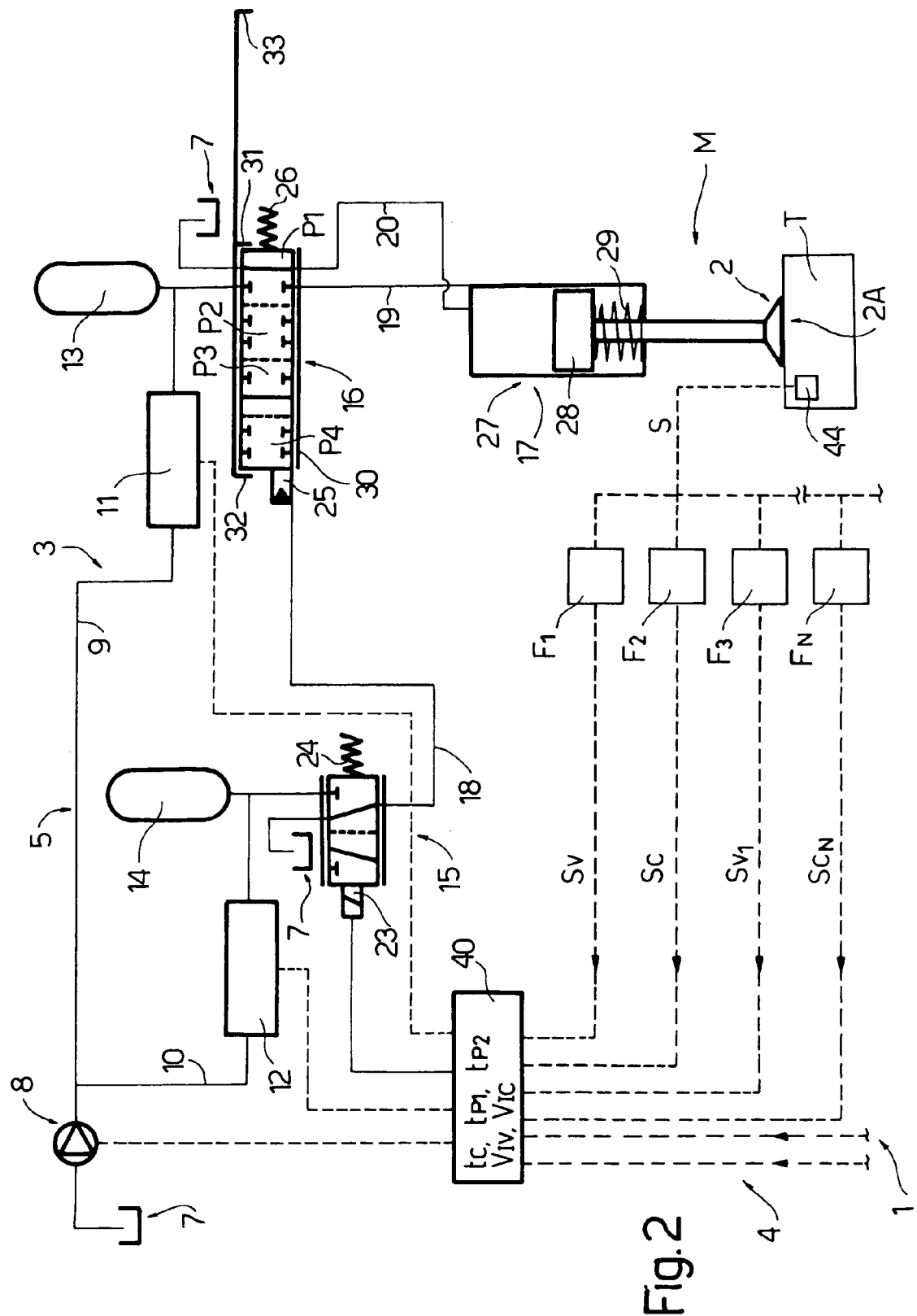
FIG. 2 is a diagrammatic view of an engine fitted with a variant of the control device of FIG. 1.

According to the variant of FIG. 2, the sensors 42 and 43 are omitted, the control device 40 comprises, in addition to the unit 40, an accelerometer 44 mounted on the head T of the engine M. In substance, the accelerometer 44 is adapted to detect an overall signal correlated with all the vibrations generated in the engine M during the operation of this engine M. The signal S contains the information relating to all the vibrations generated during the operation of the engine M and is successively filtered in order to isolate the signal associated with one of the valves 2 or with one of the slides 31. For this reason, the control device 4 comprises filters F1, F2, F3 to FN in order to isolate the signals $S_c$, $S_v$, $S_{v1}$ to $S_{vN}$. Once the overall signal S has been filtered or rather divided into a plurality of signals $S_c$ and $S_v$, the control unit 40 operates as described with reference to FIG. 1.

The variant of FIG. 2 is particularly simple in that it involves mounting a single sensor 44 on the engine M. This constructional simplicity is even more evident when the sensor 44 is formed by a detonation sensor, i.e. a sensor which is already commonly mounted on the head T of the engine M in order to detect anomalous shock waves generated by an incorrect combustion of the air-fuel mixture. In this case, it is sufficient to provide a further filter to separate the signal generated by the detonation of the engine from the magnitudes described above.

According to a variant which is not shown, the device 4 comprises a series of sensors not necessarily assigned to a slide 31 or to a valve 2 and able to acquire respective overall signals correlated with the vibrations transmitted by the moving components. As in the previous case, the filtration of the overall signals isolates the signal and the energy associated with each impact. For instance, the device 4 could include the detonation sensor 44 and a further accelerometer.

It could be necessary to mount further sensors as a result of the fact that a single sensor could be insufficient to enable the isolation of all the signals associated with a single impact but, at the same time, the installation of a specific sensor for each moving member would be excessively costly.

What is claimed is:

1. A control method for an internal combustion engine, which internal combustion engine (M) comprises at least one component, each component moving between two end positions and transmitting vibrations at the location of at least one of its end positions during the operation of the internal combustion engine (M), the method providing for the acquisition of a signal ($S_v$; $S_c$; S) correlated with these vibrations and correlated with the impact energy determined by the impact of the each moving components against an abutment disposed in at least one of these end positions; the moving components comprising a valve of the internal combustion engine (M) and the abutment being the seat of the valve; and a slide of a hydraulic slide distributor valve controlling the valve, the slide being adapted to assume two stable positions against two opposing abutments, wherein the positions of the slide are interpolated between the end positions as a function of the signal ($S_c$).

2. The method of claim 1, characterized in that the speed of impact ($V_{iv}$; $V_{ic}$) correlated with the impact is calculated as a function of this signal ($S_v$; $S_c$; S).

3. The method of claim 1, characterized in that the instant ($t_c$; $t_{P1}$, $t_{P2}$) in which the impact takes place is acquired.

4. The method of claim 1, characterized in that the internal combustion engine (M) comprises a plurality of components moving between two end positions, each moving component transmitting vibrations at the location of at least one of these end positions during the operation of the internal combustion engine (M), the method providing for the acquisition of a signal ($S_v$; $S_c$; S) correlated with these vibrations.

5. The method of claim 4, characterized in that these signals ($S_v$; $S_c$; S) correlated with the vibrations of the moving components are acquired by means of at least one sensor.

6. The method of claim 5, characterized in that the signals ($S_v$; $S_c$; S) are filtered in order to isolate the vibrations transmitted by an individual moving component.

7. The method of claim 5, characterized in that the sensor is an accelerometer.

8. The method of claim 6, characterized in that the internal combustion engine (M) comprises a detonation sensor, the method providing for the use of this sensor to acquire the signal (S).

9. A control device for an internal combustion engine, which internal combustion engine (M) comprises at least two components, each component moving between two end positions and transmitting vibrations at the location of at least one of its end positions during the operation of the internal combustion engine (M), the device comprising acquisition means for acquiring a signal ($S_V$; $S_c$; S) correlated with these vibrations; each one of the moving component impacting against at least one abutment disposed in one of the end positions; wherein the moving component comprises a valve of the internal combustion engine (M) impacting against a seat of the valve and a slide of a hydraulic slide distributor valve controlling the valves, the slide assuming two stable positions against two opposing abutments.

10. The device of claim 9, characterized in that it comprises calculator means for calculating the speed of impact ($V_{iv}$; $V_{ic}$) correlated with the impact as a function of the signal ($S_v$; $S_c$; S).

11. The device of claim 9, characterized in that it comprises acquisition means for acquiring the instant ($t_c$; $t_{P1}$; $t_{P2}$) in which the impact takes place.

12. The device of claim 9, characterized in that the internal combustion engine (M) comprises a plurality of components moving between two end positions, each moving component transmitting vibrations at the location of at least one of its end positions during the operation of the engine (M), the device comprising acquisition means for acquiring a signal ($S_v$; $S_c$; S) correlated with these vibrations.

13. The device of claim 12, characterized in that the acquisition means comprise at least one sensor.

14. The device of claim 12, characterized in that the acquisition means comprise filters (F1, F2, F3 to FN) adapted to filter the signal ($S_v$; $S_c$; S).

15. The device of claim 13, characterized in that the sensor is an accelerometer.

16. The device of claim 14, characterized in that the internal combustion engine (M) comprises a detonation sensor, the method providing for the use of this sensor as an accelerometer in order to acquire the signal (S).

17. A control method for an internal combustion engine (M) comprising a head (T); a valve of the internal combustion engine (M) moving towards and abutting against a valve seat on said head (T) and producing first vibrations by impacting on said valve seat; and a slide of a hydraulic slide distributor valve controlling the valve; said slide being operated between two stable positions against two opposing abutments and producing second vibrations by impacting against one of said opposing abutments; wherein the method comprising the steps of acquiring a first signal ($S_v$; S) correlated with said first vibrations and correlated with the impact energy determined by the impact of the said valve against the valve seat; acquiring a second signals ($S_c$; S) being correlated with said second vibrations correlated with the impact energy determined by the impact of said slide against each one of the opposing abutments; determining the intermediate positions of said slide by interpolation between the end positions of the slide as a function of the first signal ($S_v$; S) and the second signal ($S_c$; S).

18. An internal combustion engine comprising a head (T); a valve and a hydraulic distributor controlling the valve; and a control device for controlling the internal combustion engine; said valve moving towards and abutting against a valve seat located on said head (T) and said distributor comprising a slide moving between two opposing end positions and abutting against two opposing abutments of said distributor; the impact of said valve of said valve seat producing first vibrations, whereas the impact of said slide against each one of said opposing abutments produces second vibrations; wherein said control device comprises acquisition means for acquiring a first signal ($S_v$; $S_c$; S) correlated with said first vibrations; acquisition means for acquiring said second vibrations; calculating means for determining by interpolation the intermediate positions of said slide between said two end positions as a function of said second signal and control unit for controlling the position of said slide as a function of said first and second signal.

19. A control method for an IC engine (M); the IC engine comprising:
- a head (T) provided with at least a valve seat;
- at least a valve of the internal combustion engine (M) moving to and fro said valve seat on said head (T) and producing first vibrations by impacting on said valve seat; and
- at least a hydraulic slide distributor valve comprising a slide being operated between two stable positions against two opposing abutments for controlling said valve and producing second vibrations by impacting against one of said opposing abutments;

the method comprising the steps of:
- acquiring a first signal ($S_v$; S) correlated with said first vibrations and correlated with the impact energy determined by the impact of the said valve against the valve seat;
- acquiring a second signal ($S_c$; S) being correlated with said second vibrations correlated with the impact energy determined by the impact of said slide against each one of the opposing abutments;
- determining the intermediate positions of said slide by interpolation between the end positions of the slide as a function of the second signal ($S_c$; S); and
- controlling the position of said slide as a function of the first signal ($S_v$; S) and the second signal ($S_c$; S).

20. An IC engine comprising:
- a head (T) provided with at least a valve seat;
- at least a valve of the internal combustion engine (M) moving to and fro said a valve seat on said head (T) and producing first vibrations by impacting on said valve seat; and
- at least a hydraulic slide distributor valve comprising a slide being operated between two stable positions against two opposing abutments for controlling said valve and producing second vibrations by impacting against one of said opposing abutments; and
- a control device for controlling the IC engine and comprising:
- acquisition means for acquiring a first signal ($S_v$; $S_c$; S) correlated with said first vibrations;
- acquisition means for acquiring said second vibrations;
- calculating means for determining by interpolation the intermediate positions of said slide between said two end positions as a function of said second signal; and
- control unit for controlling the position of said slide as a function of said first and second signal.

* * * * *

UNITED STATES PATENT AND TRADEMARK OFFICE
CERTIFICATE OF CORRECTION

PATENT NO. : 7,092,812 B2  Page 1 of 1
APPLICATION NO. : 10/873725
DATED : August 15, 2006
INVENTOR(S) : Marco Panciroli It is certified that error appears in the above-identified patent and that said Letters Patent is hereby corrected as shown below:

Claim 19, line 5, "fro" should read --from--.

Claim 20, line 4, "fro" should read --from--.

Signed and Sealed this

First Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,092,812 B2  Page 1 of 1
APPLICATION NO. : 10/873725
DATED : August 15, 2006
INVENTOR(S) : Marco Panciroli It is certified that error appears in the above-identified patent and that said Letters Patent is hereby corrected as shown below:

Column 7, Claim 19, line 5, "fro" should read --from--.

Column 8, Claim 20, line 4, "fro" should read --from--.

This certificate supersedes the Certificate of Correction issued April 1, 2008.

Signed and Sealed this

Sixth Day of May, 2008

JON W. DUDAS
*Director of the United States Patent and Trademark Office*